(12) United States Patent
Mulchandani et al.

(10) Patent No.: US 9,674,283 B2
(45) Date of Patent: Jun. 6, 2017

(54) METHOD FOR SOLVING COHERENCY LOCK ISSUES IN PROXY SERVICES

(71) Applicant: Cisco Technology, Inc., San Jose, CA (US)

(72) Inventors: Jitesh Mulchandani, Bangalore (IN); Mangal Vithal Shrirame, Bangalore (IN); Magesh Babu Nagalingam, Bangalore (IN); Srinivas Dharmasanam, Los Altos, CA (US); Paul Theodore Mathison, San Jose, CA (US); Suresh Pachiappan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 14/155,450

(22) Filed: Jan. 15, 2014

(65) Prior Publication Data

US 2015/0200817 A1    Jul. 16, 2015

(51) Int. Cl.
  *G06F 15/173* (2006.01)
  *G06F 15/16* (2006.01)
  *H04L 29/08* (2006.01)

(52) U.S. Cl.
  CPC ........ *H04L 67/1097* (2013.01); *H04L 67/142* (2013.01); *H04L 67/28* (2013.01)

(58) Field of Classification Search
  CPC ... H04L 67/1097; H04L 67/14; H04L 67/142; H04L 67/28
  USPC .......... 709/223, 226, 227, 228, 229
  See application file for complete search history.

(56) References Cited

U.S. PATENT DOCUMENTS

| | | | | |
|---|---|---|---|---|
| 2002/0152214 A1* | 10/2002 | Muntz | ............... | G06F 17/30067 |
| 2004/0268057 A1* | 12/2004 | Landin | ............... | G06F 12/0813 711/145 |
| 2010/0185704 A1* | 7/2010 | George | ............... | G06F 12/0815 707/821 |
| 2012/0072400 A1* | 3/2012 | Allred | ............... | G06F 17/30171 707/704 |
| 2012/0179787 A1* | 7/2012 | Walsh | ................. | H04L 63/0281 709/219 |

* cited by examiner

*Primary Examiner* — June Sison
*Assistant Examiner* — Adam Cooney
(74) *Attorney, Agent, or Firm* — Merchant & Gould P.C.

(57) ABSTRACT

Methods and systems are provided for negotiating a session with a first server, wherein data within the session travels through at least a second server such as a proxy server; replacing a first client global unique identifier (GUID) with a second GUID generated by the second server; maintaining a GUID map table at the second server mapping the second GUID with the first GUID; requesting a plurality of leases on a file from the first server, wherein the each of the plurality of lease requests comprises a lease key and the second GUID, wherein the lease key is identical for each of the plurality of leases; providing caching services, wherein caching services are associated with a lease state corresponding to one of the plurality of leases; receiving an indication that a second client has made a lease request for the file; breaking the first lease upon receipt of the indication; and communicating a lease break notification to addresses associated with the second GUID.

20 Claims, 4 Drawing Sheets

METHOD FOR SOLVING COHERENCY LOCK ISSUES IN PROXY SERVICES

TECHNICAL FIELD

The present disclosure relates generally to SMB (Server Message Block protocol) coherency management and specifically to the management of lease breaks through proxy services.

BACKGROUND

SMB 2.1 and subsequent versions of SMB have leasing mechanisms to improve coherency management between different clients and server. For example, a lease may be identified by a Lease Key and Client GUID (global unique identifier). When a client is trying to access a file it may request for a lease. After granting lease to client if a change occurs on the file on the server then the server may send a lease break to client indicating that data should be flushed from the cache.

In some scenarios, a client may have same lease key for different connections to the same server accessing the same file. If the server sends a lease break addressed to the (Lease Key, Client GUID) tuple, and if more than one connection from the client has the same lease key, only the first connection from the client to the server may be given the lease break notification.

This brings problems when a proxy on the data path between the client and server caches data that serves multiple other clients who are all are asking for the same file. With such a lease scenario as explained above, only one connection from client to server will get the lease break. The remaining clients may be left in the dark about the lease break notification due to reasons such as process restarts occurring during the connection or other disruptive services. If the proxy service misses the lease break notification, the related file may be left in an inconsistent state. There exists a need to address this and other problems with coherency management in SMB to ensure that all client/server connections are aware of the lease break notification.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DESCRIPTION OF EXAMPLE EMBODIMENTS

Figure 1:
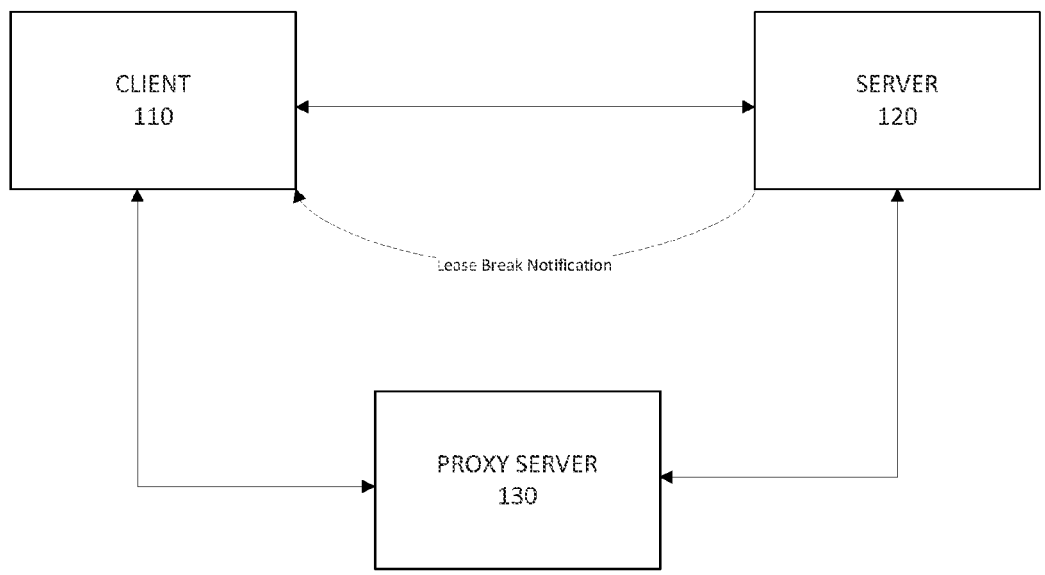
FIG. 1 is a high-level block diagram depicting an example environment in which embodiments of the present disclosure may be practiced.

The Server Message Block Protocol Versions 2 and 3, hereafter referred to as "SMB", are extensions of the original Server Message Block (SMB) Protocol. Both protocols may be used by clients, such as client 110 to request file and print services from a server 120 over one or more networks, such as Wide Area Networks (WANs) and the Internet among others. The server system may include one or more proxy servers such as proxy server 130. Proxy server 130 may be Wide Area Application Services ("WAAS") server, a WAAS Wide Area Application Engine ("a workgroup switch"), a WAAS mobile server or other such proxy server devices.

SMB may allow the client 110 to establish a connection to server 120 through a proxy server 130. Client 110 may establish an authenticated context on that connection, and then issue a variety of requests to access files, printers, and named pipes for interprocess communication. For example, client 110 may be an international mobile user requesting access to a first file, such as a data file. The first file may reside at a large capacity data center directly accessible through server 120. Client 110 may make a lease request for the first file that travels through proxy server 130 to traverse the network eventually reaching server 120 which has access to the first file at a data center for example.

The lease may use a caching mechanism to complete these SMB connections. Leases may allow clients, such as client 110 to adjust their buffering policy to increase performance and to reduce network use. The primary types of leases available are: read-caching lease—allows caching reads and may be shared by multiple clients; write-caching lease—allows caching writes and may be exclusive to only one client; and a handle-caching lease—allows caching handles and can be shared by multiple clients. In some embodiments, a lease may be a combination of one or more of the leases above, such as read/write, read/handle, and read/write/handle.

In SMB, a lease may be a mechanism designed to allow clients, such as client 110 to dynamically alter their caching strategy in a consistent manner in order to increase performance and reduce network use. In some embodiments, the caching strategy may be executed by proxy server 130. Network performance for remote file operations may be increased if client 110 can locally cache file data. Such caching may reduce or eliminate the need to send and receive additional network packets. For example, client 110 may not have to write information into the first file on server 120 if client 110 can confirm that no other client is accessing the data. Likewise, client 110 may buffer read-ahead data from the first file if client 110 confirms that no other client is writing data to the remote file. However, client 110 may not always know what activities are taking place with regards to the first file, and a lease break notification may be required when a second client attempts to access the first file. Furthermore, a lease can span multiple opens as well as multiple connections from the same client.

When a lease to client 110 is to be broken by server 120, server 120 send a lease break request. A lease break request may be an unsolicited request that is sent by server 120 to client 110 to inform client 110 to change the lease state for the first file due to attempted to access/change of the first file by a second client. This lease break request is sent on first connection by the client (client is identified by its client GUID) for that lease key. Now if client 110 has 2 connections one which is going via proxy 130 and one which is not (as shown in FIG. 1). This lease break request may traverse the network without passing by proxy 130, which leads file cache at proxy 130 to an inconsistent state. To avoid such inconsistency proxy 130 will generate a new client GUID (according to embodiments of the present disclosure) when client 110 connection is going via it, hence server will have 2 different client GUID with it. Now whenever server needs to send lease break it will send on both client GUID as they are different. And once proxy 130 will receive the break it can make cache in proper state and pass the break to client 110 also. Client 110 may receive 2 lease break in these type of scenarios one via proxy 130 and one directly by server 120 which is okay, it will not cause any harm to client 110 according to protocol.

SMB Protocol Requests

If client 110 wishes to lease the first file, a number of SMB requests may be employed. One such SMB request is "SMB2_CREATE_REQUEST_LEASE". The SMB2_CREATE_REQUEST_LEASE context is specified on an SMB2 CREATE Request packet when client 110 is requesting server 120 to return a lease for the first file. Similarly, in SMB 3.x environments, client 110 may use the request "SMB2_CREATE_REQUEST_LEASE_V2".

A buffer field of a SMB2_CREATE_CONTEXT structure may be sized at 32 bytes and contain fields including at least: a LeaseKey, a ParentLeaseKey, a LeaseState, and an Epoch value. In some embodiments, the LeaseKey is 16 bytes. The LeaseKey may be a unique key that identifies the owner of the lease.

In some embodiments, the LeaseState is 4 bytes and may represent the requested lease state as represented as one or a combination of the following values: SMB2_LEASE_NONE 0x00000000—no lease is requested; SMB2_LEASE_READ_CACHING 0x00000001—a read caching lease is requested; SMB2_LEASE_HANDLE_CACHING 0x00000002—a handle caching lease is requested; and SMB2_LEASE_WRITE_CACHING 0x00000004—a write caching lease is requested.

The buffer field of a SMB2_CREATE_CONTEXT structure may further contain a flag value that indicates whether the ParentLeaseKey is set. The ParentLeaseKey may be a 16 byte unique key that identifies the owner of the lease for the parent directory. The Epoch value may be a 2 byte value containing a 16-bit unsigned integer to track lease state changes.

When client 110 requests a lease of the first file from server 120, server 120 may respond with a message indicated that the lease has been granted. In some embodiments, a SMB2_CREATE_RESPONSE_LEASE message may be provided by server 120 through proxy server 130. The LeaseState value in the lease create message may represent the granted lease state as represented as a combination of the following values: SMB2_LEASE_NONE 0x00—no lease is granted; SMB2_LEASE_READ_CACHING 0x01—a read caching lease is granted; SMB2_LEASE_HANDLE_CACHING 0x02—a handle caching lease is granted; and SMB2_LEASE_WRITE_CACHING 0x04—a write caching lease is granted.

In some embodiments, LeaseFlags may also be indicated in the lease create message as a 4 byte value and set to zero or more values. For example a value may be represented by SMB2_LEASE_FLAG_BREAK_IN_PROGRESS 0x02. Such a value may indicate that a break for the lease identified by the lease key is in progress at one or more clients. Flags may also be set such that SMB2_LEASE_FLAG_PARENT_LEASE_KEY_SET 0x00000004, which may indicate that the ParentLeaseKey is set.

The ParentLeaseKey itself may be a 16 byte value which represents a unique key that identifies the owner of the lease for the parent directory. The Epoch value may be a 2 byte value containing a 16-bit unsigned integer incremented by the server on a lease state change.

Server 110 may send a Lease Break Notification packet when the underlying object store indicates that a lease is being broken, which represents a change in the lease state. This message may be composed of an SMB2 header, and a notification structure containing field at least indicating NewEpoch, Flags, LeaseKey, CurrentLeaseState, and NewLeaseState.

In some embodiments, NewEpoch may be 2 bytes storing a 16-bit unsigned integer indicating a lease state change by server 120. This field may only be valid for a server 120 implementing an SMB 3.x dialect family. The Flags may be 4 bytes containing at least a zero value or SMB2_NOTIFY_BREAK_LEASE_FLAG_ACK_REQUIRED 0x01. SMB2_NOTIFY_BREAK_LEASE_FLAG_ACK_REQUIRED 0x01 may indicate that a Lease Break Acknowledgment is required.

Similar to other embodiments, the LeaseKey may be a 16 byte value containing a unique key which identifies the owner of the lease. The CurrentLeaseState and NewLeaseState values may be a 4 byte values: The new lease state for the lease to be broken may contain a value represented by the new state of the lease open.

When client 110 receives a lease break notification from server 120, client 110 may locate the file in a GlobalFileTable using the LeaseKey provided by the lease break notification. Upon locating the desired first file 150, client 110 may take action based on the File.LeaseState and the new LeaseState that is received in the Lease Break Notification. Again, such lease breaks may be constantly happening in relation to the first file as any number of clients try to access the file for their own purposes, which can lead to consistency problems. Furthermore, proxy server 130 may not see the lease break notification if it is bypassed between server 120 and client 110.

For example, if File.LeaseState includes SMB2_LEASE_WRITE_CACHING and the new LeaseState does not include SMB2_LEASE_WRITE_CACHING, client 110 may flush any cached data associated with this file by issuing one or more SMB2 WRITE requests. Similarly, if File.LeaseState includes SMB2_LEASE_READ_CACHING and the new LeaseState does not include SMB2_LEASE_READ_CACHING, the client may purge any cached data.

If File.LeaseState includes SMB2_LEASE_HANDLE_CACHING and the new LeaseState does not include SMB2_LEASE_HANDLE_CACHING, client 110 may enumerate all handles in a File.OpenTable and close any cached handles that have already been closed by the application. Subsequent to these operations, the new LeaseState granted by server 120 in the Lease Break Notification may be copied to the File.LeaseState.

In some embodiments, if a lease acknowledgment is required by server 120 as indicated by the SMB2_NOTIFY_BREAK_LEASE_FLAG_ACK_REQUIRED bit in the Flags field of the Lease Break Notification, the client may send a lease break acknowledgement request. If all open handles on this file are closed (that is, File.OpenTable is empty for this file), client 110 may also consider it as an implicit acknowledgment of the lease break and no explicit acknowledgment may be required. These lease breaks need to be communicated to client 110 with existing leases on the first file, but due to system problems, proxy server 130 may be unable to do so.

In some embodiments of the present disclosure, an underlying object store may indicate the breaking of a lease by specifying the GUID, the LeaseKey, and the new lease state.

When the underlying object store indicates the lease break, server 120 may locate a Lease Table by performing a lookup in a GlobalLeaseTableList using the provided GUID as the lookup key, and then locating the Lease entry by performing a lookup in a LeaseTable.LeaseList using the provided LeaseKey as the lookup key.

If no entry is found, server 120 may not generate a Lease Break Notification. Instead, server 120 may complete the lease break call from the underlying object store with "NONE" as the new lease state, and take no further action.

If a Lease.LeaseOpens is empty, server 120 may not generate a Lease Break Notification. Instead, server 120 may complete the lease break call from the underlying object store with "NONE" as the new lease state, set a Lease.LeaseState to "NONE", and take no further action. If Lease.LeaseOpens is not empty, server 120 may construct a Lease Break Notification message to send to the client.

The Lease Break Notification may be sent to client 110 using the connection specified in Open.Connection of the first Open in Lease.LeaseOpens. In FIG. 1, the connection may specify a data path travelling through at least proxy server 130. If there was an error in attempting to transmit the Lease Break Notification to client 110, server 120 may retry the send using the connection specified in Open.Connection of the next open in Lease.LeaseOpens. If server 120 fails to send the message on any Open.Connection associated with this lease, server 120 may complete the lease break call from the underlying object store with "NONE" as the new lease state.

GUIDs Used for Lease Coherency

GUIDs (Globally Unique IDentifiers) used in embodiments of the present disclosure may be 128 bits long, and can guarantee uniqueness across varying network conditions. The GUID format may contain one or more of the following fields: 1) time_low—an unsigned 32 bit integer contained in octets 0-3 of the GUID and representative of a low field of a timestamp; 2) time_mid—an unsigned 16 bit integer contained in octets 4-5 of the GUID and representative of a middle field of the timestamp; 3) time_hi_and_version—an unsigned 16 bit integer contained in octets 6-7 of the GUID and representative of a high field of the timestamp multiplexed with a version number; 4) clock_seq_hi_and_reserved—an unsigned 8 bit integer contained in octet 8 of the GUID and representative of a high field of the clock sequence with a variant value; 5) clock_seq_low—an unsigned 8 bit integer contained in octet 9 of the GUID and representative of a low field of the clock sequence; and 6) node—an unsigned 48 bit integer contained in octets 10-15 of the GUID and representative of a spatially unique node identifier.

The GUID may be encoded as a 128-bit object, wherein the fields are encoded as 16 octets, with the sizes and order of the fields defined above, and with each field encoded with the Most Significant Byte first (known as network byte order). The version number may be in the most significant 4 bits of the time stamp (bits 4 through 7 of the time_hi_and_version field). The version number may represent at least one of 5 values: 1) a time-based version specified in this document; 2) a DCE Security version, with embedded POSIX UIDs; 3) a name-based version specified in this document that uses MD5 hashing; 4) a randomly or pseudo-randomly generated version; and 5) a name-based version that uses SHA-1 hashing.

The timestamp used to generate the GUID may be a 60-bit value. For example, this value may be represented by Coordinated Universal Time (UTC) as a count of 100-nanosecond intervals. For systems that do not have UTC available, but do have the local time, they may use that instead of UTC. In some embodiments, the timestamp may be constructed from a name as described below in more detail. In some embodiments, the timestamp may be a randomly or pseudo-randomly generated 60-bit value.

The clock sequence used to generate the GUID may help avoid duplicates that could arise when the clock is set backwards in time or if the node ID changes. If the previous value of the clock sequence is known, it can be incremented; otherwise it may be set to a random or high-quality pseudo-random value. The clock sequence may originally be initialized to a random number to minimize the correlation across systems. The initial value should not be correlated to the node identifier. In some embodiments, the clock sequence may be a 14-bit value constructed from a name as described below. In some embodiments, the clock sequence may be a randomly or pseudo-randomly generated 14-bit value.

The node used to generate the GUID may consist of a MAC address, usually the host address. For systems with multiple MAC addresses, any available one can be used. The lowest addressed octet (octet number 10) may contain the global/local bit and the unicast/multicast bit, and may be the first octet of the address. For systems with no MAC address, a randomly or pseudo-randomly generated value may be used. In some embodiments, the node field may be a 48-bit value constructed from a name as described below.

In some embodiments, the GUID may be generated in part using "names" that may be drawn from, and unique within, some "name space". The concept of name and name space in not limited to textual names, but may include without limitation: domain name systems, URLs, ISO Object IDs (OIDs), X.500 Distinguished Names (DNs), and reserved words in a programming language. It should be understood that while the disclosure is described in the context of SMB GUIDs, any unique identifier for file leases may be employed.

GUID Replacement

Going back to the previous example, client 110 may make a lease request for the first file that travels through proxy server 130 to traverse the network eventually reaching server 120 which has access to the first file at a data center. Server 120 may grant the lease request as described in detail above. Server 120 may send back a message indicating the grant of the lease request with a corresponding proxy-generated client GUID which serves as the identifier of the lease along with the lease key.

In embodiments of the present disclosure, the original client GUID may not be sufficient on its own to provide sufficient lease coherency. Thus, during the initial session negotiation between client 110 and server 120 a proxy-generated GUID may be created at proxy server 130 during negotiation. The proxy-generated GUID may be generated in any of the ways discussed above, but it should be ensured that the proxy-generated GUID is unique and specifically different from the original client GUID.

Proxy server 130 may maintain a GUID mapping table which allows mapping of client GUIDs and proxy-generated GUIDs for use in lease requests and lease breaks. Proxy server 130 may receive a client GUID associated with client 110 upon initial session creation between client 110 and server 120. Upon receipt of the client GUID, proxy server 130 may generate a new GUID which is subsequently mapped to the client GUID. Proxy server 130's GUID mapping table then logs the relationship between the proxy-generated GUID to the GUID associated with client 110.

The proxy-generated client GUID is then provided to server 120 to consummate the communication session.

Similarly, when a second client begins a communication session with server 120, proxy server obtains the GUID associated with the second client. Proxy server 130 then generates another new GUID which will also be associated with the second client. The newly generated proxy GUID is then mapped to the GUID associated with the second client. When the session creation is completed with server 120, server 120 has knowledge the proxy-generated GUIDs for client 110 and the second client. The same process may be repeated for any number of clients requesting access to the first file through server 120. The GUID mapping table at proxy server maintains the relationship between each of the original client GUIDs and the subsequently proxy generated GUIDs.

As such, server 120 has knowledge of the proxy-generated GUIDs associated with each client requesting file access. For example, when client 110 makes a lease request to server 120 to access the first file, server 120 generates a lease key which is associated with the GUID associated with client 110 generated at proxy server 130. Thus if a connection action is not seen by direct connection between server 120 and client 110, server 120 has the proxy-generated GUID associated with the lease key to ensure that lease actions are received, processed, and properly logged either directly or through proxy server 130. Subsequently, client 110 may have established a write lease to the first file and client 110 may have established a handle caching lease.

Server 120 may transmit a lease break notification to client 110, either in response to a request from client 110 or initiated by server 120 upon receipt of a lease request from a second client. The direct client 110-server 120 connection may miss the lease break notification from server 120. However, in embodiments of the present disclosure, server 120 employs the proxy-generated GUID associated with the lease key being employed by client 110. Thus, server 110 provides the lease break notification for the identified lease key to the proxy-generated GUID connection between client 110 and server 120 to ensure delivery of the lease break notification. Thus if proxy server 130 will not miss the lease break notification even if it is not successfully delivered directly from server 120 to client 110, server 120 may still successfully communicate the lease break notification to client 110 and avoid coherency problems with the lease actions of later clients.

Figure 2:
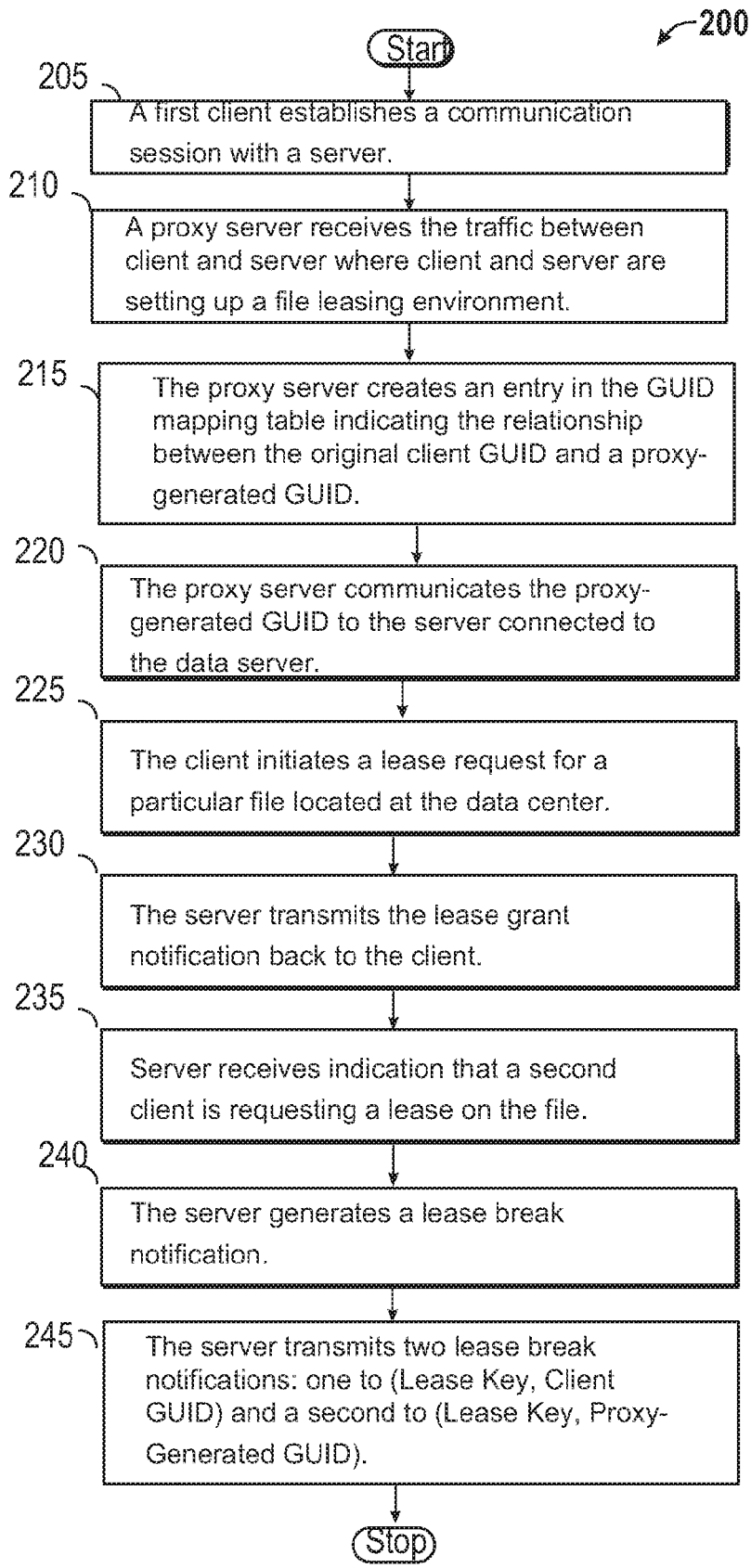
FIG. 2 is a flowchart illustrating embodiments of the present disclosure.

FIG. 2 is a flow chart illustrating aspects of embodiments of the present disclosure. Method 200 may begin at step 205 where a first client establishes a communication session with a server. The server may be connected to a large data center. The data center may store large numbers of files for which lease requests may be received and granted. Requests for file leases may come from users ranging from local users communicating across a LAN to international mobile users making requests from mobile devices where the lease request may traverse many networks and many corresponding devices, such as WAAS devices and proxy servers. Each client device may have an associated unique client GUID.

During the establishment of the communication session between the client and the server method 200 may proceed to step 210. At step 210, a proxy server, such as proxy server 130 may receive the traffic between client and server where client and server are setting up a file leasing environment. The proxy server may recognize the client GUID and determine whether there has been a previously proxy-generated GUID for this client. This may be accomplished by referring to a GUID mapping table stored at the proxy server. If no entry exists for the received client GUID, the proxy server proceeds to generate a different GUID which is associated with the client.

At step 215, after the proxy server generates a new GUID which is associated with the client, the proxy server creates an entry in the GUID mapping table. The entry indicates the relationship between the original client GUID and the proxy-generated GUID. In some embodiments, it is possible that the proxy server has previously generated a proxy GUID that is associated with the current client GUID. In such a case, the mapping table may not need to be updated, but instead may employ the previously established mapping relationship.

Once the mapping table is updated, method 200 may proceed to step 220. At step 220, the communication session establishment may be finalized as the proxy server the proxy-generated GUID to the server connected to the data server. This may finalize the establishment of the communication session between the client and the server. The finalization may include a confirmation message sent from the server to the client confirming that the communication session is active and that the server is available for file lease requests.

Method 200 may proceed to step 225 when the client initiates a lease request for a particular file located at the data center. For the sake of example, it may be assumed that the client desires a write request for a text document that multiple contributors are simultaneously editing. Maintaining coherency locks is critical so that edits are properly implemented and so that multiple parties are not overwriting one another. For example, the file may be cached by the client and the state of the file is maintained such that other write leases are not granted to different clients who may or may not receive the most current version of the file if coherency locks are not maintain.

At step 225, the write lease request is transmitted across one or more networks and network devices from the client to the server via the connection on which the request is made. The write lease request may or may not traverse the proxy server when traversing from the client to the server. The server may receive the write lease request and determine to grant the write lease to the client. When the server determines to grant the write lease request method 200 may proceed to step 230 where the server transmits a lease grant message to the client.

The server transmits the lease grant notification back to the client at step 230 via the connection on which the request is made employing a generated lease key and the associated proxy-generated client GUID. Thus, the lease grant notification is ensured to reach the client whether or not the direct connection experiences communications difficulties. Once the client receives the write lease grant notification, the lease is consummated and the client is clear to cache the desired file after receipt from the server.

The client may proceed to perform whatever actions are desired on the file. When the client completes its desired actions on the file, method 200 may proceed to step 235. At step 235, the server may receive indication that a second client is requesting a lease on the file. Upon receipt of this indication, the server may generate a lease break notification at step 240. Alternatively, the server may generate a lease break notification after determining that such a break notification is needed without input from the client.

Method 200 next proceeds to step 245, where the lease break notification is transmitted from the server to the client. In some embodiments of the present disclosure, the server transmits the lease break notification identified as (Lease Key, Proxy-Generated GUID). Thus, the server will send lease break on each (client GUID, lease Key) for that file. As server can have two client GUID for client 110 one because of direct connection and one because of via proxy connection hence it will send two lease breaks which insure proxy server will always be able to get lease break and make file cache consistent.

Figure 3:
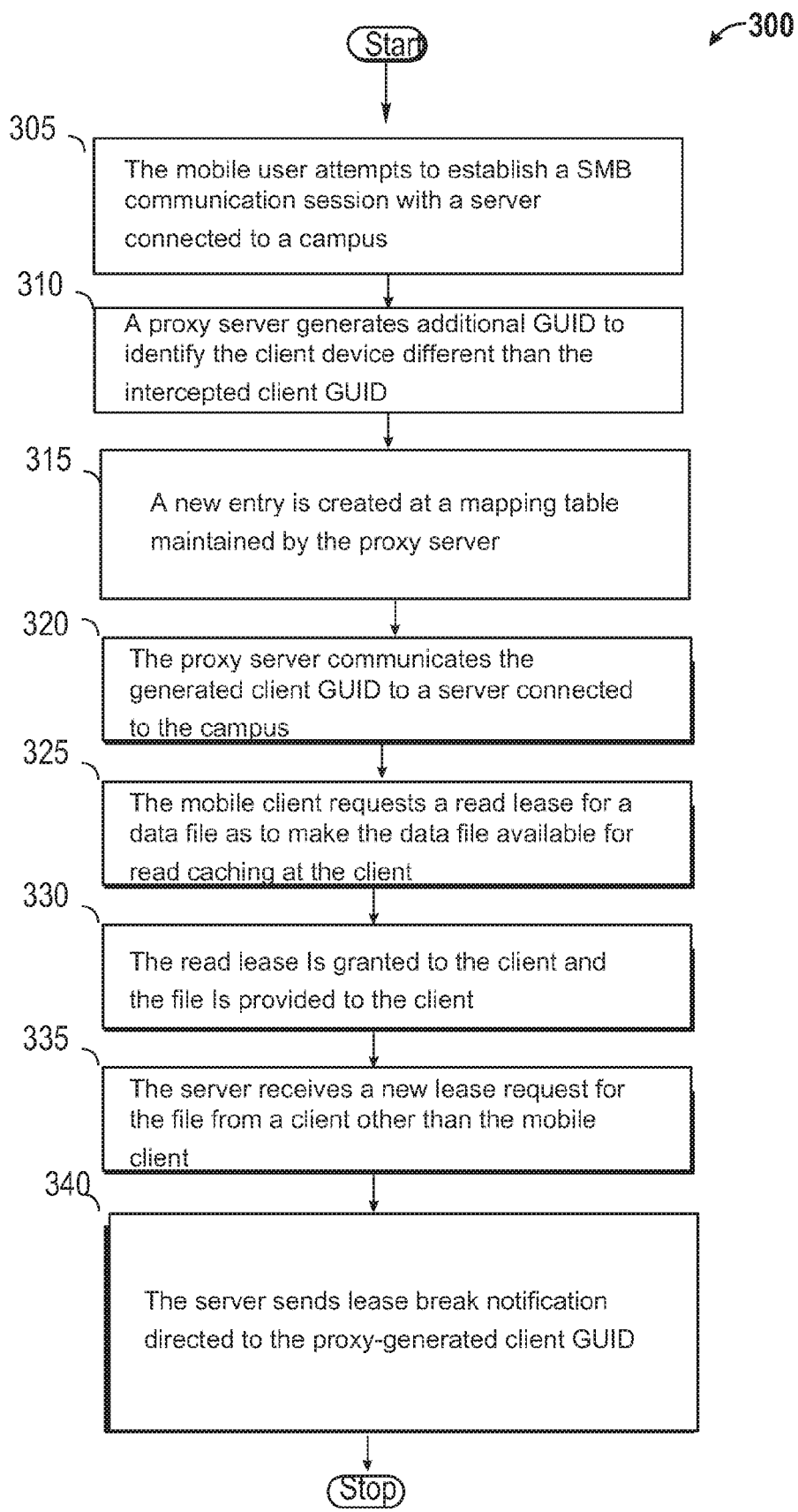
FIG. 3 is a flowchart illustrating embodiments of the present disclosure.

FIG. 3 is a flow chart illustrating aspects of the present disclosure. A client device, for example a mobile device is operating in accordance with SMB protocol. The user of the mobile device may desire to access a file for read caching purposes. The desired file may reside at a large centralized campus in one or more connected data servers. Method 300 may begin at step 305 when the mobile user attempts to establish a SMB communication session with a server connected to the campus. In some embodiments the server may be a WAAS server.

Method 300 may then proceed to step 310, where a proxy server intercepts the communications between the client and the server. The proxy server may recognize that a SMB session is being created. In response, the proxy server may generate an additional GUID to identify the client device, wherein the additional GUID is unique and different than the intercepted client GUID.

Method 300 may then proceed to step 315, where a new entry is created at a mapping table maintained by the proxy server. The new mapping entry maps the intercepted client GUID to the additional client GUID generated by the proxy server. At step 320, the proxy server may communicate the generated client GUID to the data center file server connected to the campus. The WAAS server then may associate the additional client GUID to one or more created lease keys associated with client lease requests.

For example, at step 325, the mobile client may request a read lease for a data file as to make the data file available for read caching at the client. In some embodiments, the client may have a plurality of leases for the same file using the same lease key. The read lease may be granted to the client and the file may be provided to the client at step 330. At step 335, the server may receive a new lease request for the file from a client other than the mobile client. When the server recognizes the new request, it may generate a lease break notification with the purpose of flushing the client's cached version of the file.

Method 300 proceeds to step 340 where the server sends a lease break notification. The lease break notification contains the same lease key associated with the client's read lease. However, the lease break notification may be sent directed to the proxy-generated client GUID. This ensures delivery to the client regardless of network conditions. Subsequently, the client may flush the file from the read cache in response. In some embodiments, the proxy server may unmap the two GUIDs after the SMB communication session has ended.

Figure 4:
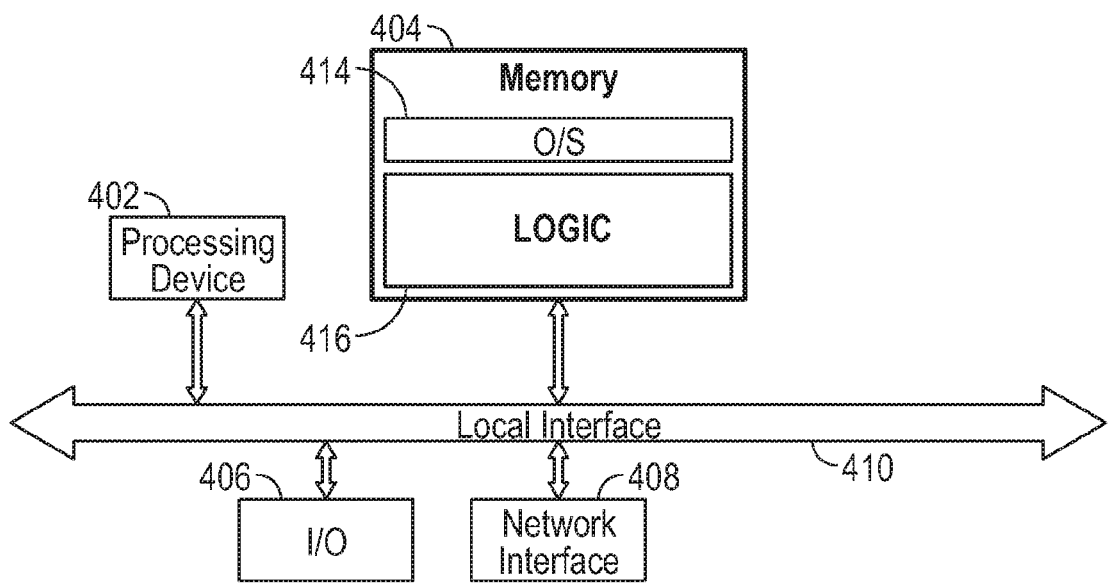
FIG. 4 is a flowchart illustrating embodiments of the present disclosure.

FIG. 4 shows a network device, such as proxy server 130 in greater detail. Client devices and server devices may have similar architectures. The network device may include a processing device 402, a memory 404, input/output (I/O) devices 406, and a network interface 408, each of which is communicatively coupled via a local interface 410. The GUID mapping table may be located within memory 404. Processing device 402 may be a hardware device for executing software, particularly that which is stored in memory 404. Processing device 402 may be any custom made or commercially available processor, a central processing unit (CPU), an auxiliary processor among several processors associated with a content server, a semiconductor-based microprocessor (in the form of a microchip or chip set), a microprocessor, or generally any device for executing software instructions.

I/O devices 406 may include input devices, for example but not limited to, a keyboard, mouse, scanner, microphone, etc. Furthermore, the I/O devices 206 may also include output devices, for example but not limited to, a printer, display, etc.

Network interface 408 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

Local interface 410 may be, for example but not limited to, one or more buses or other wired or wireless connections. Local interface 410 may have additional elements, which are omitted for simplicity, such as controllers, buffers (caches), drivers, repeaters, and receivers, to enable communications. Further, local interface 410 may include address, control, and/or data connections to enable appropriate communications among the aforementioned components and provides the interface to communicate with processing device 402.

In some embodiments, the network device may further be configured with an integrated storage device 412 coupled to local interface 410. Storage device 412 may be configured to store a plurality of content chunks. In some embodiments, storage device 412 may be used for storage of one or more GUID mapping tables or for the caching of requested file data.

Memory 404 may include a suitable operating system (O/S) 414. Operating system 414 essentially may control the execution of other computer programs, such as scheduling, input-output control, file and data management, memory management, and communication control and related services. Logic 416 may include executable code to send SMB requests to other network devices.

Memory 404 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 404 may incorporate electronic, magnetic, optical, semi-conductive, and/or other types of storage media. Note that memory 404 may have a distributed architecture, where various components are situated remotely from one another, which can be accessed by the processing device 402.

The software in memory 404 may include one or more separate programs, each of which comprises an ordered listing of executable instructions for implementing logical functions. In the embodiment shown, the software in memory 404 may include operating system 414 and logic 416, as explained above. Functionality of logic 416 may be implemented using a single module, or distributed among a plurality of modules.

When logic 416 is in operation, processing device 402 may be configured to execute logic 416 stored within memory 404, to communicate data to and from memory 404, and to generally control operations of logic 416. Logic 416 and O/S 414, in whole or in part, but typically the latter, are read by processing device 402, perhaps buffered within processing device 402, and then executed.

The network device may include a communication interface suitable for enabling communication (e.g., TCP/IP) with other network devices, and for receiving and processing SMB requests to provide leasing services to a client. For instance, communication interface may be of a type suitable for communication over an IP network, a coaxial cable network, an HFC network, and/or wireless network, among others.

Client 101 may further be configured with display and output logic, that may include graphics and video processing pipelines, among other circuitry to process the decoded pictures and associated audio and provide for presentation (e.g., display) on, or associated with, a display device or other media device. A communications port (or ports) may further be included in client 101 for receiving information from and transmitting information to other devices. For instance, a communication port may feature USB (Universal Serial Bus), Ethernet, IEEE-1394, serial, and/or parallel ports, etc. In addition, a communications port may be configured for home networks (e.g., HPNA/MoCA, etc.).

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the invention to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
   establishing a communication session with a first server, wherein data within the session travels through a second server;
   detecting a first global unique identifier (GUID) associated with the communication session, wherein the first GUID is created by a client for establishing the communication session;
   generating a second GUID for the client for establishing the communication session, wherein the second client GUID is generated by the second server during the establishment of the communication session;
   associating, in a GUID map table maintained at the second server, the second GUID with the first GUID;
   providing the second GUID to the first server for consummating the communication session;
   receiving a first lease for a file accessible by the first server, wherein the first lease comprises a lease key, wherein the first sever generates the lease key in response to the first GUID generated from the client, associates the generated lease key with the second GUID generated by the second server, and sends the lease key to both the client and the second server; and
   receiving a first lease break notification, wherein the first lease break notification is associated with the lease key and the second GUID.

2. The method of claim 1, wherein the first lease is a combination of one or more of: a read lease, a write lease, and a handle lease.

3. The method of claim 1, wherein the first lease break notification is generated in response to an indication that a change has occurred to the file at the first server.

4. The method of claim 1, wherein the first lease break notification is generated in response to an indication that a lease request has been made by a second client.

5. The method of claim 4, further comprising flushing a cached version of the file upon receipt of the first lease break notification.

6. The method of claim 1, wherein the first lease spans multiple opens as well as multiple connections from a first client.

7. The method of claim 1, wherein the second server is one of a SMB proxy server or a Wide Area Application Services ("WAAS") server.

8. The method of claim 7, wherein the first server and the second server are operating with Server Message Block protocol ("SMB").

9. The method of claim 1, wherein the lease key is identical for a plurality of leases for the file.

10. The method of claim 1, further comprising providing caching services, wherein each caching service is associated with a lease state corresponding to each of a plurality of leases.

11. A device operating with Server Message Block protocol ("SMB") comprising:
a memory; and
a processor configured to execute instructions stored in the memory, the instructions comprising:
negotiating a session with a first server by a client device, wherein a session data path includes a proxy server;
detecting a first global unique identifier (GUID) associated with the session and associated with the client device;
generating a second GUID for the client device for establishing the session, wherein the second GUID is generated by the proxy server during the establishment of the session;
associating, in a GUID map table maintained at the proxy server, the second GUID with the first GUID;
receiving a first lease for a file from the first server, wherein the first lease comprises a lease key, wherein the first server generates the lease key in response to receipt of the first GUID generated by the client device, associates the generated lease key with the second GUID generated by the proxy server, and sends the lease key to both the client device and the proxy server; and
receiving a first lease break notification for the first lease, wherein the first lease break notification is associated with the second GUID.

12. The device of claim 11, wherein the first GUID is mapped to the second GUID.

13. The device of claim 11, wherein the client device is a mobile device.

14. The device of claim 11, wherein the processor is further configured to execute instructions comprising:
requesting a plurality of leases on the file from the first server, wherein each of the plurality of leases comprises the lease key and the second GUID, wherein the lease key is identical for each of the plurality of leases; and
providing caching services, wherein each caching service is associated with a lease state corresponding to one of the plurality of leases.

15. The device of claim 14, wherein the processor is further configured to execute instructions comprising:
receiving an indication that a lease request has been made for a leased file at the first server from a second client device; and
flushing one or more caches containing copies of the leased file.

16. A method comprising:
sending a lease request for a first file to a first server, the lease request comprising a first global unique identifier (GUID) associated with a client device;
receiving a lease grant notification for the first file, the lease grant notification comprising a lease key, wherein the lease key is generated by the first server in response to receiving the first GUID from the client device, wherein the server associates the generated lease key with a second GUID generated by a second server in response to detecting the lease request from the client device, wherein the second server associates the second GUID with the first GUID in a GUID map table maintained at the second server, and wherein the second server sends the second GUID to the first server along with the association with the client device; and
receiving a lease break notification from the second server, wherein the lease break notification is addressed to the second GUID.

17. The method of claim 16, wherein the file resides at a campus on one or more connected data servers.

18. The method of claim 16, wherein the lease request is a Server Message Block protocol (SMB) lease request.

19. The method of claim 16, wherein the second server is at one of a Server Message Block protocol (SMB) proxy server or a Wide Area Application Service (WAAS) device.

20. The method of claim 19, wherein the second GUID is mapped to an original client GUID.

* * * * *